United States Patent [19]

Tsutsumi et al.

[11] Patent Number: 4,467,331

[45] Date of Patent: Aug. 21, 1984

[54] RECORDING APPARATUS

[75] Inventors: Teruo Tsutsumi, Tokyo; Tetsuo Takahashi, Kawasaki, both of Japan

[73] Assignee: Tokyo Shibaura Denki Kabushiki Kaisha, Kawasaki, Japan

[21] Appl. No.: 335,287

[22] Filed: Dec. 28, 1981

[30] Foreign Application Priority Data

Dec. 26, 1980 [JP] Japan ............................. 55-185924

[51] Int. Cl.³ ..................... G01D 9/00; G01D 15/06
[52] U.S. Cl. ................................... 346/22; 346/24; 346/153.1
[58] Field of Search ............ 346/22, 24, 25, 150, 346/153.1; 355/3 R

[56] References Cited

U.S. PATENT DOCUMENTS

| | | | |
|---|---|---|---|
| 3,965,292 | 6/1976 | Costello et al. | 346/24 X |
| 4,047,810 | 9/1977 | Morgan | 355/3 R |
| 4,122,497 | 10/1978 | Suzuki et al. | 346/24 X |

OTHER PUBLICATIONS

Toshiba Review, No. 102, Mar.–Apr. 1976, pp. 16–19, Kanagawa, JP.
Computer, vol., 8, No. 9, Sep. 1975, pp. 49–57, Long Beach, US.
Review of Electrical Communication Laboratories, vol. 28, No. 1–2, Jan.–Feb. 1980, pp. 115–130, Tokyo, JP, K. Kobayashi et al.

*Primary Examiner*—Thomas H. Tarcza
*Attorney, Agent, or Firm*—Cushman, Darby & Cushman

[57] ABSTRACT

A recording apparatus includes a recording section for sequentially recording reception signals on a continuous, unused recording paper, starting with one end thereof, a cutter for cutting the recording paper to a predetermined length after the recording of the recording paper portion is completed, a developing device for causing a latent image on the recording paper so cut to be developed into a visual image, and a fixing device for causing the visual image to be fixed as a permanent image. In the recording apparatus, a recording paper travelling path is provided which includes a diagonally upward travelling path along which the recording section and cutter are arranged, a first turning travelling path arranged at the exit side of the diagonally upward travelling path to permit the turning of a direction to be effected through a gradual curving guide member, a horizontal travelling path extending horizontally from the exit end of the first turning travelling path and along which the developing device and fixing device are arranged, and a second turning travelling path extending from the exit end of the horizontal travelling path to permit the turning of a direction to be effected through a gradually curving guide member. The recording paper is delivered from the second turning travelling path and stacked horizontally onto a stacker.

9 Claims, 2 Drawing Figures

RECORDING APPARATUS

BACKGROUND OF THE INVENTION

This invention relates to a recording apparatus for use, for example, in a facsimile receiver and in particular a recording apparatus which permits overall reduction in size as well as an improvement in operation efficiency.

The conventional recording system for use, for example, in the facsimile receiver includes, for example, an electrolytic recording, discharge recording, heat-sensitive recording, electrostatic recording and ink jet type recording system. These systems are properly selected, and used, in view of various circumstances such as the application and cost of the apparatus and the amount, speed and cost of transmission. Among them, a system whose signal is subjected to a band compression processing from the standpoint of a saving in transmission cost comes into wide, practical use and an electrostatic recording system has been mainly adopted in view of the necessity of, for example, high-speed recording, high-quality recording and excellent image retainability.

FIG. 1 shows an arrangement of a conventional facsimile receiver adopting an electrostatic recording system. In FIG. 1, reference numeral 1 shows a roll of unused, electrostatic recording paper. The recording paper is supplied through a feed roller 2 to a nip between an electrostatic recording head 3, constituting a record section, and a back roller 4. The recording head 3 at the facsimile receiver side is supplied with a facsimile signal from the facsimile transmitter side, not shown. An electrostatic latent image corresponding to an image to be recorded is formed on the recording paper 1 by the recording head 3. At this time, the feed roller 2 and back roller are intermittently rotated for each predetermined time interval by a drive means such as a pulse motor, not shown, causing the recording paper to be fed to permit a subsidiary scanning. In this way, reception recording is completed. After this is done, the recording paper 1 is further fed and cut by an automatic cutter 5 when a recording paper portion corresponding to a trailing edge of a transmitting document i.e. a predetermined recording paper portion as measured from its leading edge reaches a cutting position.

The recording paper 1, after so cut to substantially the same length as that of the transmitting document and separated away from the rest of the recording paper, is supplied to a developing device 14 through a horizontal travelling path constituted of guide members 6, 7 and 8 and feed rollers 9 and 10 and then through a turning travelling path comprised of feed rollers 11, 12 and guide member 13. The developing device 14 applies toner powder onto the cut recording paper 1 to effect development. The developed recording paper 1 is fixed by a fixing device 15 and delivered through a delivery roller 16 and stacked onto a stacker 17.

In the facsimile receiver, the recording paper is in a normal feed mode past the developing device 14 and fixing device 15. The reason for this is that upon intermittent feeding of the recording paper as at the reception recording time, a high-quality image cannot be obtained due to, for example, the nonuniform deposition of the toner power. In order to permit the recording paper 1 to be fed in the normal feed mode past the developing device 14 and fixing device 15, the device of FIG. 1 has the following arrangement. That is, the distance from the automatic cutter 5 to the feed roller 12 is made to correspond to a length greater than a recording maximum length (300 mm to 400 mm) corresponding to the length of the transmitting document with a considerably greater horizontal path left between the automatic cutter 5 and the guide member 8, and the recording paper 1 is fed at a fixed speed past the developing device 14 and fixing device 15 with the normal feed effected between the feed rollers 12 and 16. The above-mentioned apparatus has a depth substantially corresponding to the length of the horizontal travelling path from the cutter 5 to the guide member 8 plus the depth of the turning travelling path from the feed roller 11 to the guide member 13, or substantially corresponding to the depth of the turning travelling path including the guide member 13 and the roller 12 plus the length of the horizontal travelling path from the developing device 14 through the fixing device 15 to the feed roller 16 plus the length of the horizontal stacker 17. That is, the facsimile receiver of FIG. 1 has a fairly great horizontal depth and in the case of, for example, a console type facsimile receiver, an excessively bulker unit results. Moreover, a memory section is located immediately below the stacker 17 and other members, offering disadvantages of having to remove the stacker 17 etc. upon exchange or replenishment of the recording paper. It is also difficult to eliminate a hindrance such as paper jamming.

SUMMARY OF THE INVENTION

It is accordingly an object of this invention to provide a recording apparatus which permits overall reduction in its size, attainment of high-quality reception recording, an efficient operation such as the exchange and replenishment of recording papers, and maintenance of the associated parts or elements.

In order to attain the above-mentioned object, there is provided a recording apparatus comprising a recording section for effecting the recording of a continuous, unused recording paper, starting with one end thereof; a cutter for cutting the recording paper to a predetermined length after the recording of the recording paper is completed at the recording section; a developing device for causing a latent image on the recording paper so cut to be developed into a visual image, and a fixing means for causing the visual image to be fixed as a permanent image, in which a recording paper travelling path is provided which includes a diagonally upward travelling path extending diagonally upward and along which the recording section and cutter are arranged and a horizontal travelling path along which the developing device and fixing device are arranged and whose length is restricted in a range corresponding to the depth of the diagonally upward travelling path, and a stacker is horizontally arranged on the upper side of the horizontal travelling path to permit the recording paper to be stacked.

DETAILED DESCRIPTION OF THE PREFERRED EMBODIMENTS

Figure 1:
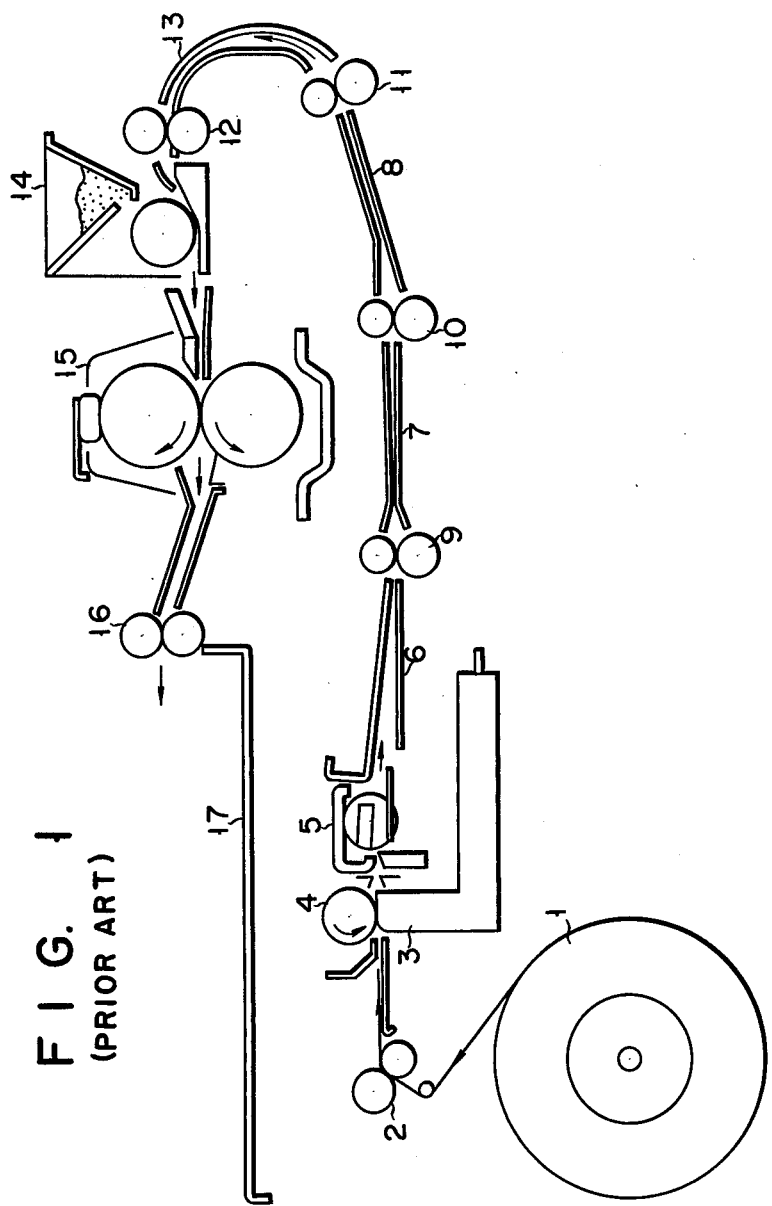
FIG. 1 is a diagrammatic view showing a conventional recording apparatus.
Figure 2:
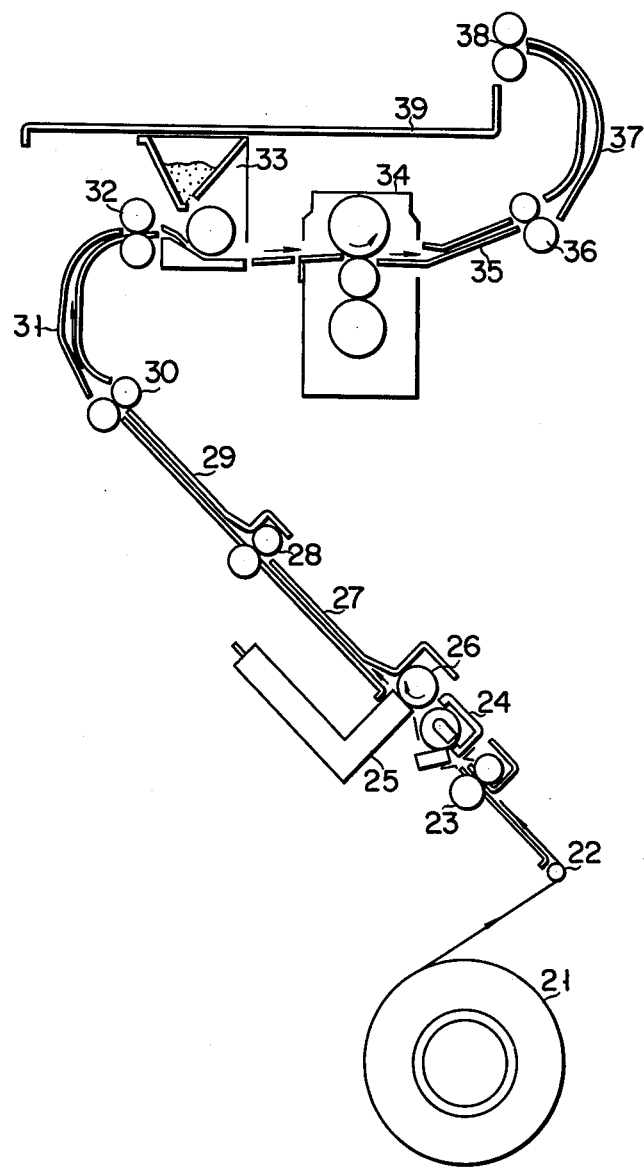
FIG. 2 is a diagrammatic view showing a recording apparatus according to the embodiment of this invention.

FIG. 2 shows a diagrammatic arrangement of a recording apparatus of this invention. In FIG. 2, reference numeral 21 shows a roll of an unused, electrostatic recording paper. The recording paper 21, after fed in a diagonally upward direction, is turned in its direction through a roller 22 and fed to a feed roller 23 located in a diagonally upward direction (for example, 45°) with respect to the roller 22. At the exit side of the feed roller 23, a recording section comprised of an automatic cutter 24, electrostatically recorded head 25 and back roller 26, guide member 27, feed roller 28 and guide roller 29 are arranged in that order along the diagonally upward travelling path. Thus, the recording paper is fed along the diagonally upward travelling path including the elements 23 to 29. The recording section, feed roller 28, guide member 30, and so on are arranged at a predetermined distance (a length somewhat shorter than a predetermined minimun document length on the transmitter side) as required. The recording paper 21 sent from the diagonally upward travelling path is turned by a first turning travelling path comprised of a feed roller 30, a gradually curving guide member 31 and feed roller 32 at the output side of the guide member 31. The recording paper 21 is fed along the diagonally upward travelling path to a developing device 33 through the feed roller 32 which is located at the exit end of the travelling path. A distance from the recording section to the feed roller 32 is set to a length greater than a recording maximum length. Since the diagonally upward travelling path is provided between the recording section and the feed roller 32, the apparatus can be manufactured at a very short depth. The recording paper 21 is travelled along a horizontal travelling path along which the developing device 33, fixing device 34, guide member 35 and feed roller 36 are arranged in that order toward the output side of the apparatus. The horizontal travelling path substantially corresponds in length to the depth of the diagonally upward travelling path. Then, the recording paper 21 is fed along a second turning travelling path along which a feed roller 36, gradually curving guide member 37 and feed roller 38 are arranged in that order, and delivered onto a stacker 39 which is located as the exit side of the feed roller 38. The stacker 39 is horizontally arranged on the upper side of the developing device 33 and it may be removably or swingably mounted.

The operation of the recording apparatus will now be explained below.

The recording paper 21 is fed toward the roller 22 where it is turned in its direction, and then supplied through the feed roller 23 into the recording section. Since the roller 22 is used as a direction turning means, the recording paper 21 can be located in a range defined by the depth of the diagonally upward travelling path. At the recording section, an electrostatic latent image corresponding to an image to be recorded is formed by an electrostatic recording head 25 onto the recording paper 21 when a facsimile signal is sent from a facsimile transmitter (not shown). At the same time, the feed roller 23 and back roller 26 are intermittently rotated for each predetermined time interval by a drive means such as a pulse motor, not shown. The recording paper 21 is conveyed by the intermittent rotation of the feed roller 23 and back roller 26 to permit it to be subjected to a subsidiary scanning. As the reception recording proceeds, the leading edge of the recording paper 21 is sent to the feed roller 30 through the feed roller 28 which is rotated in synchronism with the back roller 26 etc. The recording paper 21 is advanced along the diagonally upward travelling path into the first turning path comprised of the feed roller 30, guide member 31 and feed roller 32. Where the length of the diagonally upward travelling path (including the recording section and the guide member 29) and first turning travelling path is set to more than a recording maximum length on a receiver side, reception recording is always completed before the leading edge of the recording paper 21 reaches the feed roller 32. When the reception recording is so completed, the recording paper 21 is once moved back to a cutting position where it is cut by the cutter 24 to a predetermined length as measured from the leading edge of the recording paper. The cut recording paper is then equal in size to the size of a transmitting document. Since the path from the roller 22 to the feed roller 30 provides the diagonally upward travelling path, the apparatus requires no greater depth. After the recording paper is separated from the rest of the recording paper 21, a pulse motor is switched over to an AC motor by a control means such as a clutch, not shown, to cause the feed rollers 28, 30 to be continuously rotated. Thus, the separated recording paper is fed by the feed rollers 28, 30 at a fixed speed along the diagonally upward travelling path of, for example, 45° into the guide member 31 (located between the feed rollers 30 and 32) where it is turned in its direction and carried into the developing device 33. At the developing device 33, the latent image on the recording paper is developed by tones powder into a visible image. The visible image carrying recording paper is fixed by the fixing device 34 to provide a permanent image on the recording paper. Because the developing and fixing operations are performed while the recording paper is being travelled at a fixed speed, it is possible to make high-quality, uniform recording. The recording paper passing through the fixing device 34 is advanced past the feed roller 36 into the gradually curving guide member 37 where it is turned in its direction. Then, the recording paper 37 reaches the delivery roller 38 past the guide member 37 and is delivered onto the stacker 39 which is horizontally arranged on the upper side of the developing device 33 and fixing device 34.

Thus, the arrangement of the apparatus permits the horizontal travelling path including the developing device 33, fixing device 34 and guide member 35 and the horizontal path including the stacker to be restricted substantially in a range corresponding to the depth of the diagonally upward travelling path. This makes the depth of the apparatus much shorter, permitting the obtainment of a compact unit. Because the reception recording process includes neither any long vertical path nor any abrupt turning path, the recording paper 21 is travelled in a stable way, offering an advantage of involving a much less chance of paper jamming. Furthermore, the developed and fixed recording paper 21 is, after being turned at the turning travelling path, delivered onto the horizontal stackes 39 and stacked in the order of reception, thus making it easier to take out and arrange the recording papers. The recording section and cutter 24 are arranged on the diagonally upward travelling path to permit the ready loading of a roll of recording paper as well as the ready maintenance. Since the developing device 33 and fixing device 34 are arranged horizontally at the upper section of the apparatus, it is easier to replenish a fresh toner as well as provide the maintenance of these device.

Although the above-mentioned embodiment has been explained in connection with the facsimile receiver, this invention is not restricted thereto and can be applied to an information processing output device in general.

What we claim is:

1. A recording apparatus comprising:
   a recording section for recording signals on a continuous, unused recording paper, starting with one end thereof;
   cutting means for cutting the recording paper to a predetermined length after recording is completed;
   a diagonally upward travelling path in which said cutting means and said recording section are arranged and along which the recording paper which is cut by said cutting means travels, the diagonally upward travelling path having an exit side from which the recording paper is delivered;
   a first curved travelling path located at the exit side of said diagonally upward travelling path and having an entrance side provided in the vicinity of the exit side of said diagonally upward travelling path and exit side, to permit the changing of a direction of the recording paper back on itself to be effected through a first curved guide member which is continuously provided from the entrance side to the exit side of said first curved travelling path;
   a horizontal travelling path extending in the horizontal direction from the exit side of said first curved travelling path and having an exit side;
   a developing device provided along said horizontal travelling path for causing a latent image on the recording paper, which is fed through said first curved travelling path to be developed into a visual image.

2. A recording apparatus according to claim 1, further including means for causing the continuous, unused recording paper to be supplied through a roller in a direction opposite to that in which it is fed, so that it is supplied to said recording section.

3. A recording apparatus according to claim 1, in which said recording section includes an electrostatically recording head and a back roller.

4. A recording apparatus to claim 1, further including means for causing the recording paper travelled along the diagonally upward travelling path to be fed in an intermittent feed mode and causing the recording paper to be fed in a continuous feed mode at a constant speed after it is cut to the predetermined length.

5. A recording apparatus according to claim 1, in which said first turning travelling path includes feed rollers disposed at the entry and exit sides thereof and a gradually curving first guide member located between the feed rollers.

6. A recording apparatus according to claim 1, in which the length of said horizontal travelling path is restricted in a range corresponding to the depth of said diagonally upward travelling path.

7. A recording apparatus according to claim 1, in which said second turning travelling path includes feed rollers located at the entry and exit ends thereof and a gradually curving second guide member located between said feed rollers.

8. A recording apparatus according to claim 1, in which said stacking means is substantially horizontal arranged on the upper side of said horizontally travelling path.

9. A recording apparatus according to claim 1, in which the depth of said second turning travelling path and said stacking means is restricted in a range corresponding to the depth of said diagonally upward travelling path.

* * * * *